United States Patent [19]
Patel et al.

[11] Patent Number: 5,139,794
[45] Date of Patent: Aug. 18, 1992

[54] USE OF ENCAPSULATED SALTS IN CHEWING GUM

[75] Inventors: Mansukh M. Patel, Downers Grove; Kevin B. Broderick, Berwyn; Edward S. Dubina, Evergreen Park; Joo H. Song, Northbrook; Steven E. Zibell, Palos Heights, all of Ill.

[73] Assignee: Wm. Wrigley Jr. Company, Chicago, Ill.

[21] Appl. No.: 475,686

[22] Filed: Feb. 6, 1990

Related U.S. Application Data

[63] Continuation-in-part of Ser. No. 340,384, Apr. 19, 1989, Pat. No. 4,978,537, and a continuation-in-part of Ser. No. 418,662, Oct. 10, 1989.

[51] Int. Cl.$^5$ ................................................ A23G 3/00
[52] U.S. Cl. ........................................ 426/3; 426/5; 426/96
[58] Field of Search ............. 426/5, 72, 96, 649, 426/806

[56] References Cited

U.S. PATENT DOCUMENTS

| | | | |
|---|---|---|---|
| 2,631,119 | 3/1953 | Ferguson, Jr. | 426/3 |
| 2,700,012 | 1/1955 | Merckel et al. | 426/3 |
| 3,655,866 | 4/1972 | Bilotti | 426/3 |
| 3,681,087 | 8/1972 | Johnson, Jr. | 426/3 |
| 3,795,744 | 3/1974 | Ogawa et al. | 426/5 |
| 3,826,847 | 7/1974 | Ogawa et al. | 426/5 |
| 4,088,788 | 5/1978 | Ream et al. | 426/3 |
| 4,151,270 | 4/1979 | Ream et al. | 424/48 |
| 4,154,814 | 5/1979 | Hand et al. | 424/48 |
| 4,978,537 | 12/1990 | Song | 426/5 |

FOREIGN PATENT DOCUMENTS

| | | |
|---|---|---|
| 0229000 | 7/1987 | European Pat. Off. |
| 0438913 | 7/1987 | European Pat. Off. |
| 0263224 | 4/1988 | European Pat. Off. |
| WO89/02703 | 4/1989 | PCT Int'l Appl. |

*Primary Examiner*—Jeanette Hunter
*Attorney, Agent, or Firm*—Willian, Brinks, Olds, Hofer, Gilson & Lione

[57] ABSTRACT

The use of encapsulated salts to enhance flavor and sweetness characteristics of gum is disclosed. The gum of the present invention comprises gum base, a sweetening and bulking agent, a flavoring agent, and a salt encapsulated in a manner to delay its release from the gum composition during chewing. The encapsulated salt is made by standard coating and encapsulation techniques. The gum is made by standard mixing techniques, though it is preferred to mix the encapsulated salt into the molten gum base.

24 Claims, No Drawings

USE OF ENCAPSULATED SALTS IN CHEWING GUM

CROSS REFERENCE TO RELATED APPLICATIONS

This application is a continuation-in-part of U.S. patent application Ser. No. 07/340,384, titled Gradual Release Structures for Chewing Gum, filed Apr. 19, 1989, now U.S. Pat. No. 4,978,537, incorporated herein by reference.

This application is also a continuation-in-part of U.S. patent application Ser. No. 07/418,662, entitled Gradual Release Structures Made from Fiber Spinning Techniques, filed Oct. 10, 1989, incorporated herein by reference.

BACKGROUND OF THE INVENTION

The present invention relates to chewing gum and methods of making the same, and more particularly to gum containing encapsulated salt to enhance the flavor and sweetness characteristics of the gum.

Salts such as common table salt, sodium chloride, and salts used as salt substitutes, such as potassium chloride, are commonly used in food products to enhance flavors. When such salts are added to chewing gum, a distinctly salty taste results.

For some special uses, such a salty taste may be desired, or at least acceptable. In other instances the salt may be used for special purposes but at a level below which it provides a salty taste. For example, in U.S. Pat. No. 2,631,119, salt is used in gum as part of a therapeutic appetite salient composition.

U.S. Pat. Nos. 4,088,788 and 4,151,270 disclose saliva stimulation chewing gum compositions for use by persons while exercising which include sodium and potassium salts to help replenish those salts lost in perspiration. The preferred combined salt levels in the patents are 0.52% and 0.32% of the gum composition, respectively.

U.S. Pat. No. 4,154,814 discloses a therapeutic chewing gum containing about 2% to about 6% sodium chloride and about 0.1% to about 0.5% potassium chloride bound in the insoluble gum base. The patent suggests that the objectionable salty taste can be overcome if the weight ratio of sodium chloride to potassium chloride is at least 3:1, preferably 5:1 and most preferably 10:1.

PCT Application No. PCT/US88/03283, published Apr. 6, 1989, as WO89/02703, discloses a gum composition sweetened with thaumatin or monellin, and including salt at a level of about 10 to about 1000 parts per million by weight in the gum. The salt is physically separated from the thaumatin or monellin to prevent integration and denaturing of the sweetener. One of the suggested separation techniques is to encapsulate or coat the salt to prevent its interaction with the sweetener.

Because the salts used to enhance flavor are highly water soluble, they are easily extracted from chewing gum. Therefore, even if they are used to improve the flavor, they have to be used at low levels to avoid imparting a salty taste to the gum. At these low levels, however, the salts are not effective to improve the flavor for any significant period of time.

SUMMARY OF THE INVENTION

It has been found that by coating or encapsulating salt so as to delay its release from a gum composition, the salt may be added to the gum at levels such that it will provide a prolonged flavor enhancing effect without imparting a salty taste. The present invention includes chewing gums containing gum base, sweetening and bulking agents, a flavoring agent, and salt encapsulated in a manner to delay its release from the gum composition. The present invention also includes a process for making chewing gum comprising the steps of mixing a gum base, a bulking and sweetening agent and a flavoring agent into a chewing gum composition, improved in that a salt encapsulated in a form so as to delay its release from the gum is also mixed into the gum composition. The slow release of the salt allows larger amounts of salt to be used in the gum without importing a salty taste. The salt gives mint type flavors less bitterness after sweetness is gone from the gum. For fruit flavors, slow release salt may enhance the flavor, and may reduce bitterness as well.

DETAILED DESCRIPTION OF THE INVENTION AND PREFERRED EMBODIMENTS

As used herein, the term chewing gum includes all types of gum compositions, including chewing gum, bubble gum and the like.

All percents used herein are weight percents unless otherwise specified.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 and about 95 percent by weight of the gum. More preferably the insoluble gum base comprises between about 10 and about 50 percent by weight of the gum and most preferably between about 20 and about 35 percent by weight of the gum.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises between about 5 and about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum contains a bulking and sweetening agent. In sugar gums, the bulking and sweetening agent is the same, sucrose. In sugarless gums, the bulking and sweetening agents usually include sorbitol and high potency sweeteners like aspartame. The bulking and sweetening agents usually comprise from about 30 to about 90 percent of the gum composition, and preferably about 50 to about 80 percent.

The water-soluble portion of the chewing gum may further comprise softeners, other sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

The flavoring agent used in the gum may be present in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorally acceptable blend. All such flavors and flavor blends are contemplated by the present invention. However, mint flavors and fruit flavors appear to have the best enhancement by use of the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further portions of the bulking agent may then be added to the mixer. The flavoring agent is typically added with the final portion of the bulking agent. The entire mixing procedure typically takes from five to fifteen minutes, but longer mixing times may sometimes be required.

In practicing the present invention, salt is incorporated in the gum composition in a manner which will delay its release from the gum composition. Generally between about 0.01 and about 0.5 percent active salt may be used, preferably between about 0.02 and about 0.2 percent, and most preferably between about 0.03 and 0.1 percent. The active salt may be selected from the group consisting of sodium chloride, potassium chloride, ammonium chloride, other chloride salts, salt substitutes, and mixtures thereof. Where NaCl and KCl are used in a blend, the preferred blend is between about 4:1 and about 1:1 NaCl to KCl, most preferably 61% NaCl and 39% KCl. Most preferred is pure sodium chloride.

The salt is generally coated or encapsulated to provide a delayed release. The methods of encapsulating the salt include, but are not limited to, agglomeration, spray drying, spray congealing, fluid bed coating, coacervation, fiber spinning and combinations thereof. These standard coating techniques generally give varying degrees of coating from partial to full coating, depending on the coating composition used in the process. The encapsulation media should be a water insoluble food grade material like zein or shellac. However, the coating compositions used may be susceptible to water permeation to various degrees. Any encapsulating material would be satisfactory that delays the release of the salt.

Generally, compositions that have high organic solubility, good film forming properties and low water solubility give better delayed release of the salt materials. Such compositions include acrylic polymers and copolymers, carboxyvinyl polymer, polyamides, polystyrene, polyvinyl acetate, polyvinyl acetate phthalate, polyvvinypryrrolidone, polyethylene, polypropylene, waxes and mixtures thereof. Other materials which are more water soluble, but good film formers, are materials like natural gums such as agar, alginates, guar gum, carrageenan, gum tragacanth, xanthan gum and mixtures thereof; and a wide range of cellulose derivatives like ethyl cellulose, methyl cellulose, sodium hydroxmethyl cellulose, and hydroxypropylmethyl cellulose, dextrin, modified starches and mixture thereof. These ingredients, which are generally approved for food use, also give only a slightly delayed release. Materials like shellac, gelatin, zein and mixtures thereof, will give a delayed release of saltiness, which will reduce saltiness in the early flavor release, reduce saltiness in the later chew and allow a slow release of salt to reduce the bitterness of the flabor in the later stages of chewing. The ratio of salt to coating agent will depend heavily on the coating material used, but will generally be in the range of a ratio of about 40:60 salt to coating material.

A sample of NaCl/KCl blend was encapsulated with polyethylene by fiber spinning for initial testing. The blend was a ratio of 61% NaCl and 39% KCl. This material blend was fiber spun to encapsulate the salt according to the process disclosed in U.S. Pat. application Ser. No. 4,978,537. The fiber spun salt, when used in chewing gum, gave a spot problem. This problem appears to result when large salt crystals, which are hygroscopic, absorb moisture. This is especially apparent when crystals are encapsulated with insoluble materials like polyethylene. By pre-mixing the encapsulated salt with molten base, cooling, solidifying the base, and adding it to a gum formula, the moist spot problem was eliminated. The present invention, however, is not limited to adding encapsulated salt to molten base. Other methods of preblending with other materials are also contemplated.

Another method of eliminating the salt spot problem is to preblend the powdered salt with a flow agent (preferably one that repels water) before encapsulation. Such flow agents include magnesium stearate, stearic acid, paraffin and microcrystalline waxes, polyethylene waxes, mineral and other lubricating oils, and talc. The level of salt to flow agent in this embodiment of the invention is between about 99:1 to about 80:20. The preferred flow agent is magnesium stearate at a ratio of 90:10 salt to magnesium stearate.

EXAMPLE 1

A powdered NaCl/KCl blend was encapsulated by fiber spinning as above. The encapsulated salt blend was screened to give a particle size passing through a U.S. Standard #100 mesh sieve and remaining on a U.S. Standard #140 mesh sieve. The final product had an active salt level of 40%.

To 60 grams of molten gum base (220° F.), 15 grams of screened fiber spun salt blend was added and mixed 5 minutes. This fiber spun salt blend/base mixture was then used in a peppermint flavored gum formula:

| Ingredients: | Percent |
|---|---|
| Salt blend/Base | 0.7 |
| Base | 21.0 |
| Sugar | 54.3 |
| Dextrose Monohydrate | 13.4 |
| 43 Baume Corn Syrup | 5.1 |
| CaCO3 Filler | 2.0 |
| Glycerin | 2.0 |
| Peppermint Flavor | 1.5 |
| | 100.0 |

COMPARATIVE EXAMPLE 2

Instead of the mixture used above, a powdered salt blend of NaCl/KCl at a ratio of 61/39 was blended and added to the gum formula of Example 1 at 0.056% active salt. This is the same active salt level as Example 1.

EXAMPLE 3

Instead of the fiber spun salt blend/base mixture used in Example 1, the fiber spun salt blend was added directly to the gum formula of Example 1 without premixing in base, and used at the same active salt level.

When the 3 examples were sheeted into stick form and stored at 70°-80° F. and 30-40% RH for three weeks, Examples 2 and 3 developed wet spots on the gum surface. This is believed due to the hygroscopic nature of the salt crystals. In Example 1, no wet spots appeared, indicating the base/fiber spun salt was more thoroughly blended in the base.

In a formal sensory panel, Examples 1 and 2 were found to give significant differences. As expected, the gum of Example 2 had a salty taste that faded quickly leaving a typically bitter peppermint taste after about 5 minutes of chewing. The gum of Example 1 did not have any salty taste throughout the entire chewing period, and had a reduced bitterness in flavor after about 5 minutes of chewing. It was concluded that the slow release of salt due to encapsulation gives improved flavor of chewing gum over extended periods.

EXAMPLE 4

Powdered sodium chloride was encapsulated with PVAc instead of polyethylene by fiber spinning similar to Example 1. The encapsulated salt was screened to give a particle size passing through a U.S. Standard #100 mesh sieve and remaining on a U.S. Standard #325 mesh sieve.

To 60 grams of molten gum base (220° F.), 15 grams of screened fiber spun salt was added and mixed 5 minutes. This salt/base blend was then used in a spearmint flavored gum formula similar to Example 1, but using a spearmint flavor instead of a peppermint flavor and at a level of 0.8% salt/base blend, giving an active salt level of 0.064% in the gum.

In sensory tests, the gum of Example 4 did not have any salty taste throughout the entire chewing period, but had a reduced bitterness in flavor throughout 5 minutes of chewing. Encapsulation and broad particle size distribution seems to give a more controlled release of salt to give an improved overall flavor perception.

The following gum formula is used in Examples 5-15.

| Ingredients: | Percent |
|---|---|
| Base | 20.2 |
| Sugar | 54.344 |
| 45.5 Baume Corn Syrup | 13.3 |
| Dextrose Monohydrate | 9.9 |
| Glycerin | 1.3 |
| Peppermint Flavor | 0.9 |
| Salt (Active) | 0.056 |
| | 100 |

COMPARATIVE EXAMPLE 5

This formula used 0.056% uncoated, powdered sodium chloride for comparison tests.

COMPARATIVE EXAMPLE 6

This formula used 0.034% uncoated, powdered sodium chloride and 0.022 uncoated, powdered potassium chloride (ratio = 61/39) at an active combined salt level of 0.056% for comparison tests.

EXAMPLE 7

A ratio of 61/39 NaCl/KCl was encapsulated by spray drying with methocel, E5M, hydroxypropylmethyl cellulose (HPMC) from Dow Chemical to give a product having an active salt level of 20.2%. This encapsulated salt was used in the above formula and compared to Example 6 in sensory tests. Results showed that the gum of Example 7 had less of a salty taste in the initial chew, but the flavor was described as heavier, less cooling and creamier, with a slightly salty aftertaste. It was concluded that this type of encapsulation was not sufficient to totally eliminate upfront saltiness and reduce late chew bitterness, but the flavor was slightly improved, as well as its duration.

EXAMPLE 8

Powdered sodium chloride was fluid bed coated with 20% solids zein in alcohol to give a product with a 12% coating and 88% active salt. The product was screened and 2 mesh sizes were used to make gum formulations. The 2 sizes were:

A—product remaining on #60 U.S. Standard mesh.

B—product passing through #100 U.S. Standard mesh, but remaining on #325 U.S. Standard mesh.

Sensory tests comparing these 2 gum samples to the gum of Example 5 showed that both samples extended the release rate of salt, and had low initial saltiness, with A having a longer time before being released. Sample B had more peppermint flavor character with less harshness, probably due to a more uniform release rate of salt.

EXAMPLE 9

Powdered sodium chloride can be fluid bed coated with 20% solids zein in alcohol to give a product with a 50% coating and 50% active salt. This product, after screening, can be used in gum to give a controlled release of salt.

EXAMPLE 10

Powdered sodium chloride can be fluid bed coated with a 25% solids shellac solution in alcohol to give a product with a 60% coating and 40% active salt. This product, after screening, can be used in gum to give a controlled release of salt.

EXAMPLE 11

A solution of sodium chloride and gelatin in a ratio of 70/30 can be film dried at a 20% solids level to give a product with 70% active salt. This product after screening, can be used in gum to give a controlled release of salt.

EXAMPLE 12

A 15% HPMC, 85% active sodium chloride powder mixture can be obtained by agglomerating an HPMC and salt mixture blended together, with water being added, and the resulting product being dried and ground.

EXAMPLE 13

Sodium chloride can be agglomerated with HPMC in a ratio of 85/15 salt/HPMC. After drying and grinding, the resulting powder can be agglomerated with a 15% solids, high pH, aqueous solution of zein to give a final product containing about 60% active salt, 10% HPMC, and 30% zein.

EXAMPLE 14

The product from Example 12 can be fluid bed coated with alcohol/zein solution at about 20% solids to give a final product containing about 60% active salt, 10% HPMC, and 30% zein.

EXAMPLE 15

Powdered sodium chloride was preblend with magnesium stearate in a ratio of 89:11 salt to magnesium stearate for one half hour in a powder blender. This mixture was then encapsulated with PVAc by fiber spinning as in Example 1 to give a final product containing 40% sodium chloride, 5% magnesium stearate, and 55% PVAc. After grinding and screening, the fiber spun salt was added to the gum formulation without premixing in base. The resulting gum was sheeted into stick form. After storage at 70°-80° F. and 30-40% RH for 3 weeks, it is expected that no wet spots will develop on the gum surface.

The gum and method of preparation of Example 4 comprise the preferred embodiments of the invention. Of course, it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

We claim:

1. In a chewing gum containing about 5 to about 95% gum base, about 30 to about 90% sweetening and bulking agents and about 0.1 to about 10% flavoring agent selected from the group consisting of mint and fruit flavors, the improvement comprising:

a) including a sufficient amount of salt within the chewing gum that would normally provide a salty taste to the gum, the salt being encapsulated in a manner so as to delay its release from the gum composition during chewing such that the salt does not impart a salty taste to the gum, the encapsulated salt being effective to enhance the mint or fruit flavor of the gum.

2. The improved chewing gum of claim 1 wherein the salt is selected from the group consisting of sodium chloride, potassium chloride, ammonium chloride, other chloride salts and salt substitutes and mixtures thereof.

3. The improved chewing gum of claim 1 wherein the salt is encapsulated with a coating composition selected from the group consisting of acrylic polymers and copolymers, carboxyvinyl polymer, polyamides, polystyrene, polyvinyl acetate, polyvinyl acetate phthalate, polyvinylpyrrolidone, polyethylene, polypropylene, waxes and mixtures thereof.

4. The improved chewing gum in claim 1 wherein salt is encapsulated with a coating material selected from the group consisting of agar, alginates, guar gum, gum tragacanth, carrageenan, xanthan gum and mixtures thereof.

5. The improved chewing gum of claim 1 wherein the salt is encapsulated with a coating material selected from the group consisting of ethyl cellulose, methyl cellulose, sodium hydroxymethyl cellulose, hydroxypropylmethyl cellulose, dextrin, modified starches and mixtures thereof.

6. The improved chewing gum of claim 1 wherein the salt is encapsulated by a coating material selected from the group consisting of shellac, gelatin, zein and mixtures thereof.

7. The improved chewing gum of claim 1 wherein the salt comprises between about 0.01 and about 0.5 percent of the gum composition.

8. The improved chewing gum of claim 1 wherein the encapsulated salt has a particle size such that it will pass through a U.S. Standard #100 mesh sieve.

9. The improved chewing gum of claim 8 wherein the encapsulated salt has a particle size such that it will be retained on a U.S. Standard #325 mesh sieve.

10. In a process for making chewing gum comprising the steps of mixing about 5 to about 95% gum base, about 30 to about 90% bulking and sweetening agents and about 0.1 about 10% flavoring agent selected from the group consisting of mint and fruit flavors into a chewing gum composition, the improvement comprising:

a) providing a sufficient amount of salt that would normally provide a salty taste the gum, the salt being encapsulated in a form so as to delay its release from the gum composition to avoid imparting a salty taste to the gum, but the encapsulated salt being effective to enhance the mint or fruit flavor of the gum; and b) mixing the encapsulated salt into the gum composition.

11. The improved process of claim 10 wherein the encapsulated salt is mixed with the gum base while the gum base is in a molten form.

12. The improved process of claim 10 wherein the salt is encapsulated by a process selected from the group consisting of agglomeration, spray drying, spray congealing, fluid bed-coating, coacervation, fiber spinning and combinations thereof.

13. The improved process of claim 10 wherein the salt is selected from the group consisting of sodium chloride, potassium chloride, ammonium chloride, other chloride salts, salt substitutes and mixtures thereof.

14. The improved process of claim 10 wherein the salt is encapsulated with a coating agent selected from the group consisting of acrylic polymers and copolymers, carboxyvinyl polymer, polyamides, polystyrene, polyvinyl acetate, polyvinyl acetate phthalate, polyvinylpyrrolidone, polyethylene, polypropylene, waxes and mixtures thereof.

15. The improved chewing gum in claim 10 wherein salt is encapsulated with a coating material selected from the group consisting of agar, alginates, guar gum, gum tragacanth, carrageenan, xanthan gum and mixtures thereof.

16. The improved process of claim 10 wherein the salt is encapsulated with a coating agent selected from the group consisting of ethyl cellulose, methyl cellulose, sodium hydroxymethyl cellulose, hydroxypropylmethyl cellulose, dextrin, modified starches and mixtures thereof.

17. The improved process of claim 10 wherein the salt is encapsulated with a coating agent selected from the group consisting of shellac, gelatin, zein and mixtures thereof.

18. The improved process of claim 10 wherein the salt is preblended with a flow agent before the salt is encapsulated.

19. The improved process of claim 18 wherein the flow agent is selected from the group consisting of magnesium stearate, stearic acid, paraffin wax, microcystalline wax, polyethylene wax, mineral and other lubricating oils, talc and mixtures thereof.

20. A chewing gum comprising:
   a) about 5 to about 95% gum base;
   b) about 30 to about 90% bulking and sweetening agent;
   c) about 0.1 to about 10% flavor selected from the group consisting of mint and fruit flavors; and
   d) about 0.01 to about 0.5% salt, said salt being sufficient to normally provide a salty taste to the gum, but being encapsulated in a form effective to provide a lengthened flavor and sweetness duration to the gum without imparting a salty taste to the gum, thereby enhancing the mint or fruit flavor of the gum.

21. The chewing gum of claim 20 wherein the salt incorporated into the gum comprises between about 0.03% and about 0.1% of the gum composition.

22. The chewing gum of claim 20 wherein the salt comprises a blend of sodium chloride and potassium chloride at a ratio of about 4:1 to about 1:1, and wherein the salt is encapsulated with a coating agent in a ratio of about 40:60 salt to coating material.

23. The chewing gum of claim 20 wherein the salt is sodium chloride, and wherein the salt is encapsulated with a coating agent at a ratio of about 40:60 salt to coating agent.

24. The chewing gum of claim 22 wherein the salt incorporated into the gum comprises between about 0.02% and about 0.2% of the gum composition.

* * * * *

UNITED STATES PATENT AND TRADEMARK OFFICE
CERTIFICATE OF CORRECTION

PATENT NO. : 5,139,794

DATED : August 18, 1992

INVENTOR(S) : MANSUKH M. PATEL et al.

It is certified that error appears in the above-identified patent and that said Letters Patent is hereby corrected as shown below:

On title page, item [56]
"References Cited", after the 4,154,814 reference, insert:

--4,230,687    10/1980    Sair et al. ............... 426/73
  4,384,004    5/1983     Cea et al. ............... 426/5
  4,386,106    5/1983     Merritt et al. ........... 426/5
  4,515,769    5/1985     Merritt et al. ........... 426/3
  4,556,566    12/1985    Bell ..................... 426/96
  4,556,567    12/1985    Meyer .................... 426/96
  4,563,359    1/1986     Shimizu .................. 426/96
  4,673,577    6/1987     Patel .................... 426/5
  4,734,290    3/1988     Meyer .................... 426/96--.

In column 1, line 33, please delete "salient" and substitute therefor --satient--.

In column 2, line 14, please delete "importing" and substitute therefor --imparting--.

UNITED STATES PATENT AND TRADEMARK OFFICE
CERTIFICATE OF CORRECTION

PATENT NO. : 5,139,794
DATED : August 18, 1992
INVENTOR(S) : MANSUKH M. PATEL et al.

It is certified that error appears in the above-identified patent and that said Letters Patent is hereby corrected as shown below:

In column 4, lines 31 and 32, please delete "hydrox-methyl" and substitute therefor --"hydroxymethyl--.

In column 4, lines 48 and 49, please delete "application Ser.".

In column 7, line 41, please delete "preblend" and substitute therefor --preblended--.

IN THE CLAIMS

Col. 8, claim 10, line 48, "0.1about" should read --0.1 to about-- and

Col. 8, line 53 after "taste" insert --to--

Col. 10, claim 19, line 1, delete "cystalline" and substitute --crystalline--

Signed and Sealed this

Eighteenth Day of January, 1994

Attest:

BRUCE LEHMAN

Attesting Officer      Commissioner of Patents and Trademarks